United States Patent [19]

Skotte

[11] Patent Number: 4,780,034
[45] Date of Patent: Oct. 25, 1988

[54] RESTRAINT BARRIER

[75] Inventor: Karl G. Skotte, Bellevue, Wash.

[73] Assignee: The Boeing Company, Seattle, Wash.

[21] Appl. No.: 911,755

[22] Filed: Sep. 26, 1986

[51] Int. Cl.$^4$ .............................................. B60P 1/64
[52] U.S. Cl. ..................................... 410/129; 410/54; 410/154
[58] Field of Search ................. 410/121, 129, 140, 94, 410/52, 77, 130, 87, 88, 154

[56] References Cited

U.S. PATENT DOCUMENTS

| Re. 28,788 | 4/1976 | Williams, III | 410/118 |
|---|---|---|---|
| 2,669,402 | 2/1954 | Del Mar. | |
| 3,025,804 | 3/1962 | Bruning | 410/129 |
| 3,044,800 | 7/1962 | Wicker | 410/129 X |
| 3,486,723 | 12/1969 | Harrison. | |
| 3,593,671 | 7/1971 | Bramlett. | |
| 3,762,341 | 10/1973 | Adler | 410/129 X |
| 3,779,174 | 12/1973 | Doyle. | |
| 4,096,807 | 6/1978 | Woodward. | |
| 4,124,136 | 11/1978 | Bjelland et al. | 410/129 X |
| 4,247,237 | 1/1981 | Brown. | |
| 4,515,506 | 5/1985 | Van Gompel et al. | 410/77 X |
| 4,607,990 | 8/1986 | Eggars | 410/94 X |

Primary Examiner—Robert B. Reeves
Assistant Examiner—Russell D. Stormer
Attorney, Agent, or Firm—Christensen, O'Connor, Johnson & Kindness

[57] ABSTRACT

Disclosed is a barrier for use in a vehicle to restrain equipment and cargo in the event of a sudden deceleration of the vehicle. The barrier includes a honeycomb panel provided with thin face sheets on its forward and aft surfaces. A channeled frame surrounds the perimeter of the panel and is provided with attachment fittings for securing the assembly to the vehicle. A pair of vertically disposed, spaced-apart straps are located on the forward surface of the panel in line with, and attached to, the attachment fittings. In the event of sudden vehicle deceleration, equipment or cargo may be thrown forward into the barrier, applying a load thereto. The honeycomb panel withstands the load developed normal to the barrier. The components of the load that are developed "in-plane" with the barrier are transferred to the straps by the particular configuration of straps and attachment fittings.

19 Claims, 3 Drawing Sheets

RESTRAINT BARRIER

The Government has rights in this invention, pursuant to Contract No. N00019-83-C-0176, awarded by the U.S. Navy.

TECHNICAL FIELD

This invention relates to restraint barriers for use in vehicles and, more particularly, to high-strength, lightweight barriers for use in restraining vehicle cargo and equipment in the event of a sudden change in vehicle velocity.

BACKGROUND OF THE INVENTION

Given the relatively high speeds of many forms of transportation and their somewhat unpredictable operating conditions, retraint barriers are frequently employed to maintain the desired separation of passengers, cargo, and equipment in the event of an abrupt stop. This is particularly true of aircraft where emergency landings, at relatively high speeds, are sometimes required. Under these conditions, cargo and equipment may be thrown forward in the aircraft, presenting a substantial risk of injury or death to the crew in the cockpit. Further, important, expensive equipment located in the cockpit may be damaged or destroyed.

While it sometimes is possible to adequately restrain equipment and cargo by securing the individual pieces directly to the structure of the aircraft, a number of problems are presented. First, a particular piece of equipment, for example, may not be located adjacent a structural member of sufficient strength to withstand the load developed by the equipment under such conditions. Second, the equipment or cargo involved may not be readily susceptible to a form of direct attachment having suitable strength. Third, the nature and strength of the direct attachment required may make it difficult and time-consuming to load and unload cargo, as well as replace equipment. Finally, direct attachment of a large number of pieces of equipment and cargo may be expensive and consume an inordinate amount of space.

As an alternative to adequately and individually securing each item of cargo and equipment, some prior art proposals secure equipment and/or cargo to the aircraft by smaller, less substantial forms of direct attachment and utilize a barrier to provide the primary means of restraint.

One example of such a restraint barrier is illustrated in U.S. Pat. No. 2,669,402 (Del Mar). There, a high-strength network of radial and concentric yieldable bands is employed to reinforce an aircraft impact bulkhead. The bulkhead separates the crew and cargo and the network is located forward of the bulkhead. In the event that sudden deceleration of the aircraft causes the individual cargo restraints to fail, the cargo is initially restrained by the impact bulkhead. The force exerted by the cargo may distend the bulkhead and network, applying a preload to the network. If the force is sufficient to cause the impact bulkhead to fail, the network immediately assumes the full restraint of the cargo, thereby protecting the crew.

An alternative form of restraint for use on vehicles having open, flat cargo-carrying surfaces is disclosed in U.S. Pat. No. 3,779,174 (Doyle et al.). A retaining panel is employed as a bulkhead and is adjustable on the cargo surface of the vehicle by way of a comb arrangement that engages stake pockets provided along the cargo surface. The retaining panel consists of wooden boards, or sheet metal, held in place by metal channels provided around the perimeter of the panel. With the position of the panel adjusted as desired, the panel is chained to the cargo-carrying surface.

While such barriers may be capable of restraining cargo and equipment in the event of an abrupt deceleration of the vehicle, they suffer from a number of shortcomings. For example, in order to withstand high loads, such barriers must be relatively heavy and consume a significant amount of vehicle space. This appears particularly true of the arrangement disclosed by Doyle et al. where wood or sheet metal is used to withstand the loads applied. Similarly, the arrangement disclosed by Del Mar requires the use of an impact bulkhead in conjunction with the high-strength network of bands.

Prior art restraint devices also are not particularly adaptable to preexisting vehicle structure and conditions. For example, the impact bulkhead and cable network employed by Del Mar extend across the entire cross section of the fuselage. Thus, movement of the crew between the cockpit and cargo area is limited. In addition, it may be difficult to add such an arrangement to an existing aircraft at a particular location, given the structural requirements of the impact bulkhead. The Doyle et al. arrangement appears equally unadaptable to existing vehicles in that stake pockets must be provided along the cargo-carrying surface of the vehicle. A final shortcoming of the prior art restraint barriers is their relative cost. The complexity of the arrangements makes their production and installation in the vehicle expensive. The weight and space requirements of such barriers also make operation of the vehicle so equipped less economical by increasing fuel consumption and decreasing cargo space.

In light of the shortcomings of the prior art, a restraint barrier is needed that is capable of withstanding substantial loading, and which is lightweight, adaptable to existing vehicle structure, and economical to construct, install, and use.

SUMMARY OF THE INVENTION

In accordance with this invention, a vehicle restraint barrier is provided to maintain a desired separation of passengers, cargo, and equipment during a sudden change in the velocity of the vehicle. The barrier includes a panel having a plurality of thin-walled cells arranged in a honeycomb pattern and extending between face sheets that define first and second surfaces of the panel. The barrier also includes means for withstanding loads applied to the barrier that are induced parallel to, or in-plane with, the first and second surfaces. During a sudden change in vehicle velocity, the barrier must withstand loads applied by the cargo and equipment. The panel withstands those loads applied to the barrier that are induced perpendicular to the surfaces. As already noted, the barrier includes means for withstanding in-plane loads. Thus, the barrier is able to restrain the cargo and equipment, thereby maintaining the desired separation of passengers, cargo and equipment.

In accordance with a particular aspect of the invention, a channeled frame is bolted to the perimeter of the honeycomb panel. The frame holds the panel in place and allows it to be conveniently attached to the aircraft. A pair of spaced-apart straps are provided adjacent the forward surface of the panel, their ends connected to attachment fittings provided on the upper and lower portions of the frame. The resultant assembly is attached to the vehicle by tie rods secured to the attachment fittings. The attachment fittings are designed to transfer to the straps those loads that are developed parallel to the panel. Thus, the panel is required to withstand only loads normal to the barrier and can be made of the relatively lightweight, honeycomb material.

BRIEF DESCRIPTION OF THE DRAWINGS

The invention can best be understood by reference to the following portion of the specification, taken in conjunction with the accompanying drawings in which.

DETAILED DESCRIPTION OF THE PREFERRED EMBODIMENT

Figure 1:
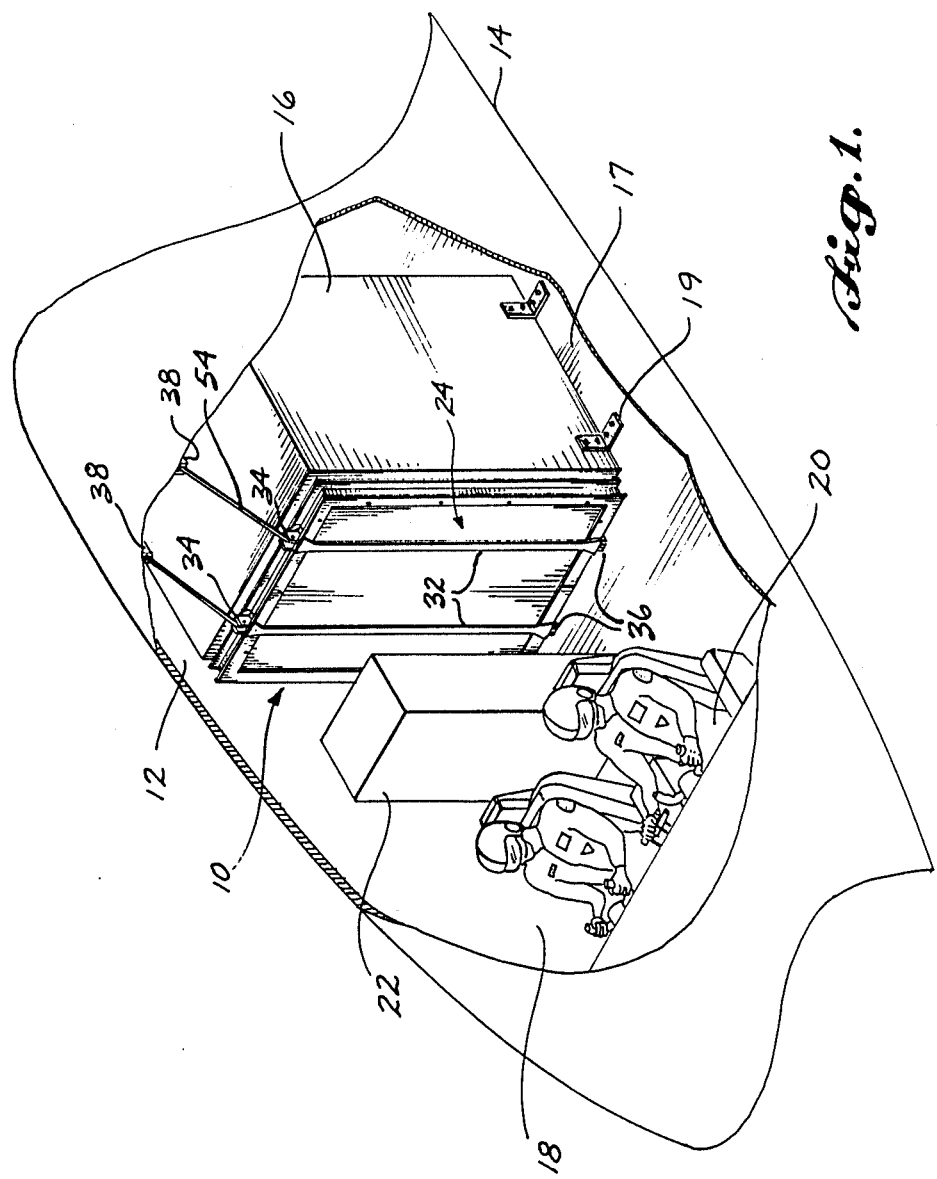
FIG. 1 illustrates an embodiment of the restraint barrier employed in an aircraft to restrain equipment located aft of the cockpit during, for example, a water landing of the aircraft.

The invention will now be considered in greater detail with respect to FIG. 1. There the restraint barrier 10 is shown, for example, secured in cabin 12 of an aircraft 14. The equipment 16 to be restrained is located aft of barrier 10 and is secured to the floor 17 of aircraft 14 by L-shaped brackets 19. The cockpit 18 is located forward of barrier 10 and houses crewmembers 20 and equipment 22. Brackets 19 are of sufficient strength to hold equipment 16 securely in place during normal operation of the aircraft 14. For example, brackets 19 may be designed to withstand a force applied to equipment 16 approximately equal to 2 g, or twice that exerted by gravity. In the event of an emergency, however, the equipment 16 may be exposed to significantly greater forces. For instance, it is anticipated that an aircraft 14 forced to perform a water landing without the necessary flotation landing equipment may be exposed to forces in the 8 g- to 16 g-range. Under such conditions, brackets 19 will fail and the momentum of equipment 16 will carry it forward into contact with barrier 10.

As will be discussed in greater detail below, the loading of barrier 10 produced by the restraint of equipment 16 includes components that are both normal to, and "in-plane" with, barrier 10. The normal component is the direct result of the force applied by equipment 16 to barrier 10. The in-plane component, on the other hand, is attributable to the bending of the barrier 10 during loading, as well as to the nonhorizontal attachment of the top of the barrier to the aircraft.

Figure 2:
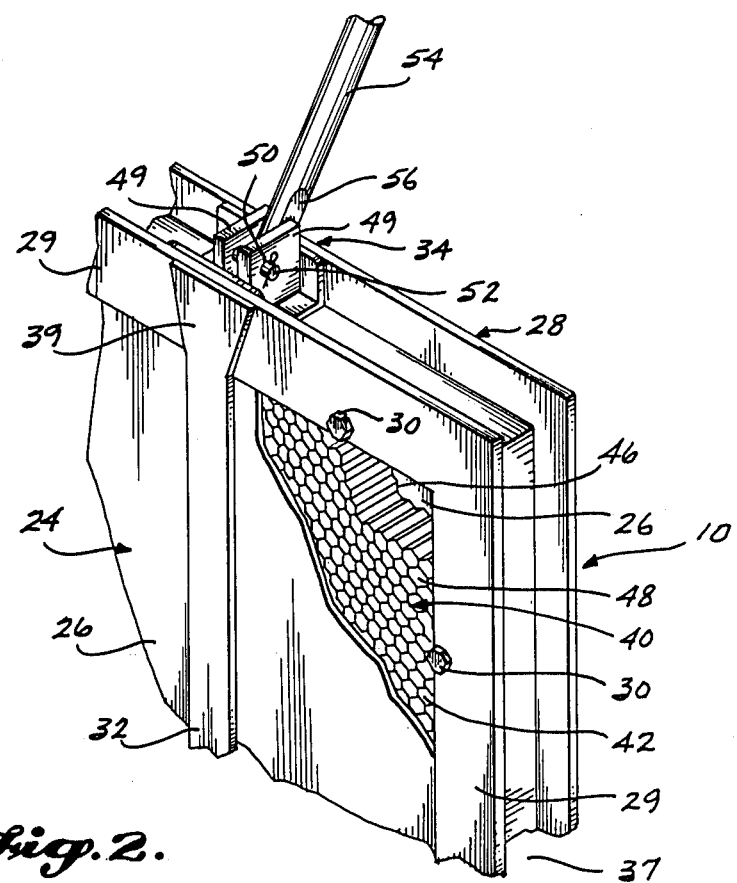
FIG. 2 is a partially cut away, pictorial view of an upper corner of the restraint barrier of FIG. 1.

As shown in FIGS. 1 and 2, barrier 10 includes a panel 24, which forms the primary load-bearing structure relative to forces that are perpendicular to panel 24. Panel 24 is composed of a honeycomb core 40 of open cells 42 (FIG. 2) closed by face sheets 26. Cores of this type are well known in many fields. Typically, strips of nonmetallic fabric or metallic sheets or ribbons are joined together at intervals to form the cells 42. Face sheets 26 define forward and aft surfaces 44 and 46, respectively, on opposing sides of core 40. These surfaces are substantially perpendicular to the relatively thin walls 48 of cells 42.

In a preferred embodiment, core 40 is made of aluminum, and hexagonal cells 42 are employed. The size of the cells 42 used depends, in part, on the magnitude of the load to be restrained. Smaller cells are less likely to buckle when loaded than larger cells having the same wall thickness. Similarly, the thickness of core 40 and cell walls 48 can be increased to strengthen core 40. The width and height of core 40 are selected to approximate the width and height of the equipment 16 or cargo to be restrained.

Panel 24 is somewhat flexible and able to withstand substantial loading normal to surfaces 44 and 46. The cellular nature of the core also makes panel 24 extremely lightweight. Thus, the relatively high strength-to-weight ratio of panel 24 allows it to withstand the loads produced by equipment 16 perpendicular to barrier 10 without adding significantly to the weight of the aircraft 14 or consuming an inordinate amount of space.

Face sheets 26 also allow panel 24 to withstand the bending load induced in the event panel 24 is impacted by equipment 16. In the preferred embodiment, sheets 26 are made of 0.032- to 0.050-inch (approximately 0.08- to 0.12-centimeter) thick aluminum. As with core 40, the thickness and material of sheet 26 are selected to accommodate the anticipated maximum loads restrained.

While the advantages of constructing panel 24 from honeycomb core 40 and face sheets 26 are substantial, the use of these components in this application imposes other constraints. First, a simple, convenient, strong, and inexpensive means of attaching panel 24 to the aircraft 14 is required. Because of the relatively thin, lightweight materials used, this requirement is not easily satisfied. Second, while the ability of honeycomb panel 24 to withstand perpendicular loads is substantial, panel 24 is able to withstand only minor "in-plane" loads (i.e., loads parallel to panel 24 or perpendicular to the axes of cells 42). Given the potential for relatively high in-plane loading, some means of absorbing such loads must be provided if panel 24 is to be used. As is described below, the present invention meets these constraints without loss of the advantages provided by panel 24.

Figure 3:
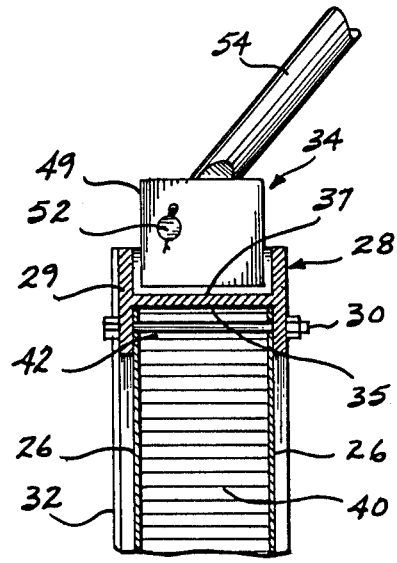
FIG. 3 is a partial cross-sectional view of an upper portion of the barrier.

As shown in FIG. 3, channeled frame 28, formed by I-beams 29, extends about the perimeter of panel 24. In this arrangement, the outer region of each edge of panel 24 extends into a U-shaped channel 35 of the I-beams 29, with the edges of sheets 26 in abutment with the inner surfaces of the I-beams 29.

Frame 28, once attached to panel 24, provides a convenient means for securing panel 24 to the aircraft. While a bonded connection between the edges of panel 24 and the U-shaped channel 35 of I-beams 29 could be employed, this technique is relatively time-consuming, expensive, and may fail to adequately support panel 24 within frame 28 when panel 24 is loaded. To overcome these problems, alternative methods of securing frame 28 to panel 24 are preferred. For example, as shown in FIGS. 2 and 3, spaced-apart bolts 30 extend through the parts of I-beams 29 that form channel 35, passing through forward face sheet 26, cell 42 of core 40, and aft face sheet 26 of panel 24. Bolts 30 prevent panel 24 from slipping out of the channel 35 of frame 28 when loaded by equipment 16. Alternatively, though not illustrated, bands may be placed around the assembly of panel 24, face sheets 26, and frame 28, either horizontally or vertically, to retain panel 24 in the channel 35.

Figure 4:
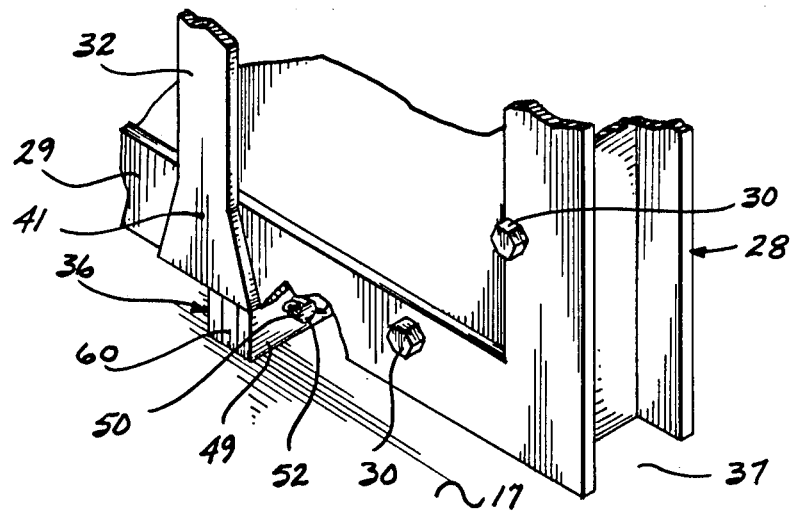
FIG. 4 is a pictorial view of a lower corner of the restraint barrier of FIG. 1.

To substantially increase the in-plane strength of barrier 10 required by the use of nonhorizontal tie rods, straps 32 are provided adjacent the forward surface 44 of panel 24. Each strap 32 extends vertically between attachment fittings on the upper and lower I-beams 29 of frame 28. A first end region 39 of each strap 32 is attached to an upper attachment fitting 34 provided on the upper I-beam 29. A second end region 41 of each strap is similarly attached to a lower attachment fitting 36 provided on the lower I-beam 29, as shown in FIG. 4. As will be recognized, the spacing between straps 32 determines the relative flexure of panel 24 when loaded. For example, with the straps 32 and attachment fittings 34 and 36 positioned relatively far apart, the portion of panel 24 that extends between straps 32 can undergo greater bending than when straps 32 are positioned closer together. Similarly, with straps 32 and attachment fittings 34 and 36 placed close together, the outer portions of panel 24 are free to bend more when loaded than with the straps located relatively far apart.

In the preferred embodiment of barrier 10, straps 32 are formed of aluminum and exhibit the width and thickness required to withstand the maximum in-plane loading that can be exerted on barrier 10. The end regions 39 and 41 of straps 32 attached to upper and lower I-beams 29 taper outwardly, providing a greater area of attachment to the forward faces of the attachment fittings.

As noted, upper and lower attachment fittings 34 and 36 are provided on frame 28 and provide connection points for the ends of straps 32. These fittings allow barrier 10 to be secured to aircraft 14 and are constructed to transfer loads developed in the barrier 10 to the aircraft structure.

As shown in FIG. 2, each upper attachment fitting 34 includes spaced-apart, rectangular plates 49 that extend orthogonally across the upwardly facing channel 37 of upper I-beam 29. A tie rod 54 extends downwardly from a cabin fitting 38 that is attached to the aircraft structure at a point above equipment 16 and aft of upper attachment fitting 34. The lower end of tie rod 54 exhibits a rectangular cross section and is positioned between the spaced-apart plates 49. A retaining pin 52 passes through aligned openings 50 in plates 49 and the lower end of the rod 54 to secure the upper attachment fitting 34 to aircraft 14.

The use of tie rods 54 enhances the ability of barrier 10 to be used with existing aircraft 14. For example, if structural points having sufficient strength to withstand the loads applied to barrier 10 are not vertically aligned in the aircraft 14, some structural modification of aircraft 14 would ordinarily be required. With tie rods 54 used, however, the lower attachment fittings 36 can be secured at a point of suitable strength on floor 17 and the upper attachment fittings 34 connected to structure aft of the barrier as desired. As noted above, because tie rods 54 are directed nonhorizontally from barrier 10, significant "in-plane" loads are developed within barrier 10 when loaded. The attachment fittings 34 are constructed to transfer substantially all of this loading to straps 32.

FIG. 4 illustrates a lower attachment fitting 36, which is similar to upper fitting 34. As shown, tie rods 54 are not used in conjunction with the lower attachment fittings 36. Rather, a single plate 60 affixed to the floor 17 of aircraft 14 is positioned between the two fitting plates 49. A retaining pin 52 passes through aligned openings 50 in fittings 36 and plate 60.

As noted earlier, upper and lower attachment fittings 34 and 36 are constructed to transmit the loads developed in-plane with barrier 10 to straps 32. Basically, this requires the proper positioning of openings 50 in upper and lower attachment fitting plates 49, which can be understood with reference to the force diagram depicted in FIG. 5.

Figure 5:
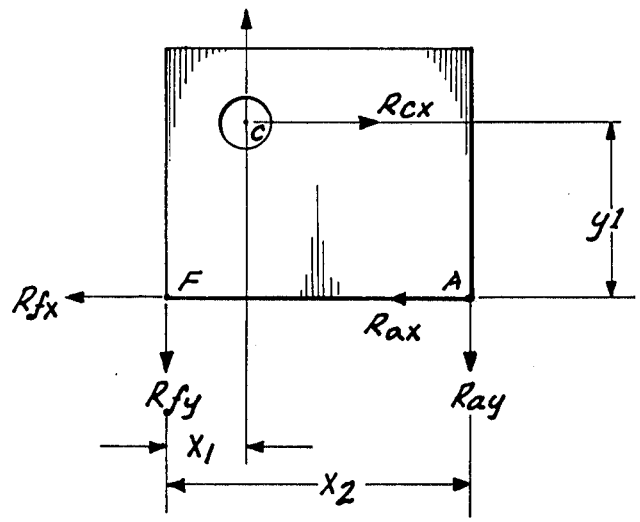
FIG. 5 is a diagram illustrating the arrangement of, and forces applied to, the upper attachment fittings used to secure the barrier to the vehicle.

Three points on upper attachment fitting 34 that are of interest are identified in FIG. 5. Point C corresponds to the center of the opening 50 through which pin 52 passes. Point A corresponds to the lower corner of fitting 34, which is substantially in the plane of aft surface 46 of panel 24. Point F corresponds to the lower forward corner of fitting 34, which is in the plane of forward surface 44 of panel 24.

At each of these points, forces, or reactions, can be identified, which, in sum, represent the total forces acting upon upper attachment fitting 34. As is shown in FIG. 5, each of these forces can be divided into horizontal and vertical components. Thus, the forces applied at point C are, arbitrarily, an upwardly directed force $R_{cy}$ and an aft-directed force $R_{cx}$. At point F, there is shown a downward-directed force $R_{fy}$ and a forward-directed force $R_{fx}$. Similarly, a downward-directed force $R_{ay}$ and forward-directed force $R_{ax}$ are illustrated at point A.

The relative spacing of points F, C, and A can be identified with rectangular coordinates in the following manner. Arbitrarily assigning to point F the coordinates (0,0), point C can then be identified as located at $(x_1,y_1)$ and point A can be identified as being located at $(x_2, 0)$.

With barrier 10 loaded during crash conditions and equipment 16 restrained, the attachment fitting 34 is at equilibrium and the sum of the moments about point F must equal zero. Therefore:

$$\circlearrowleft M_f = 0 = R_{fx}(0) + R_{fy}(0) + R_{ax}(0) + R_{ay}(x_2) - R_{cy}(x_1) + R_{cx}(y_1) \qquad (1)$$

With the objective of producing zero force in the aft surface 46 of panel 24, it is clear that that condition is satisfied when $R_{ay}=0$. Thus, solving equation (1) for $R_{ay}$ yields:

$$R_{ay} = [R_{cy}(x_1) + R_{cx}(y_1)]/x_2 = 0 \qquad (2)$$

From equation (2) it is clear that, under these conditions:

$$R_{cy}(x_1)/x_2 = R_{cx}(y_1)/x_2 \qquad (3)$$

Thus, given the forces $R_{cy}$ and $R_{cx}$ developed by equipment 16, one can arbitrarily select either the horizontal or vertical locational dimension of opening 50 with respect to frame 28 and solve for the other dimension required to produce zero load in the aft surface 46. The proper location of opening 50 can be determined in the foregoing manner for both upper and lower attachment fittings 34 and 36.

Operation of restraint barrier 10 is as follows. When aricraft 14 is subject to a substantial change in velocity, for example, during an emergency landing, the contents of the aircraft 14 experience significant forwardly directed forces. Although equipment 16 is bolted to the floor 17 of cabin 12, the magnitude of the forces may cause it to break free. In this case, without restraint barrier 10, the crewmembers 20 and equipment 22 located in cockpit 18 would be placed in serious danger.

With restraint barrier 10 in place, however, equipment 16 contacts the aft surface 46 of panel 24. Panel 24 and frame 28 withstand the loading applied normal to panel 24 and both may flex somewhat. Bolts 30, however, prevent panel 24 from slipping out of the frame 28. As noted previously, attachment fittings 34 and 36 direct substantially all of the in-plane loading developed in panel 24 to straps 32. Any residual in-plane loads experienced by panel 24 are absorbed by face sheets 26. The precise distribution of normal and in-plane loading developed throughout the barrier 10 depends upon the angle of the tie rods 54, the geometry of barrier 10, and the manner in which equipment 16 loads barrier 10 during deceleration. It has been found, however, that barrier 10 is relatively tolerant of such disparities in loading.

The resultant barrier 10, so configured and arranged, successfully employs the high shear and bending strength properties of the honeycomb panel 24, while simultaneously providing sufficient attachment and in-plane loading capabilities. The result is an extremely lightweight, strong, restraint barrier that is simple to manufacture and install and that takes up a minimum of cargo space.

Those skilled in the art will recognize that the embodiments of the invention disclosed herein are exemplary in nature and that various changes can be made therein without departing from the scope and spirit of the invention. In this regard, the straps and attachment fittings employed to withstand in-plane loading in the barrier could be horizontally disposed on the forward surface of the barrier. Similarly, a variety of core patterns as well as core, frame, and strap materials could be employed. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. A restraint barrier, securable within a vehicle to maintain a desired separation of passengers, cargo, and equipment during a sudden change in the velocity of said vehicle, said restraint barrier maintaining said separation by withstanding normal and in-plane components of loads developed in said barrier by said cargo and said equipment during said sudden change in velocity, said restraint barrier comprising:
    a honeycomb panel, having first and second surfaces for withstanding the normal component of said loads developed substantially perpendicular to said barrier;
    means for withstanding the in-plane component of said loads developed in said barrier substantially parallel to said panel, said means for withstanding said in-plane components being operably linked to said panel; and
    attachment means, operably linked to said panel, for directing said in-plane component of said loads to said means for withstanding said in-plane component, said attachment means comprising at least one pair of spaced-apart plates operably linked to said panel and provided with aligned openings that define an axis of restraint barrier attachment that is positioned with respect to said plates to produce substantially zero force in said first surface of said honeycomb panel when said barrier withstands said loads.

2. The barrier of claim 1, wherein said attachment means comprises:
    at least one tie rod, having a first end operably linked to said panel and a second end arranged for connection to said vehicle.

3. The barrier of claim 2, wherein said means for withstanding said in-plane component of said loads comprises:
    at least one strap positioned adjacent one of said first and second surfaces, said strap extending across said one of said first and second surfaces and having ends that are operably linked to said attachment means.

4. The barrier of claim 3, wherein said openings are provided in said spaced-apart plates in accordance with the solution of the expression:

$$R_{cy}(x_1)/x_2 = R_{cx}(y_1)/x_2$$

where
$R_{cx}$ = the force developed at said axis of restraint in the direction of said first surface of said honeycomb panel;
$R_{cy}$ = the force developed at said axis of restraint in a direction normal to that of $R_{cx}$;
$x_1$ = the spacing between said axis of restraint and the plane of said second surface of said honeycomb panel;
$x_2$ = the spacing between said axis of restraint and the plane of said first surface of said honeycomb panel; and
$y_1$ = the spacing between said axis of restraint and said honeycomb panel in a direction parallel to said first and second surfaces.

5. The barrier of claim 4, further comprising:
    a frame attached along the perimeter of said panel, said frame being constructed to retain said perimeter of said panel when said loads are applied to said barrier, said attachment means being secured to said frame.

6. The barrier of claim 5, wherein said frame has a substantially I-shaped cross section and is bolted to said panel.

7. The barrier of claim 5, wherein said tie rod is directed at an acute angle to the planes of said first and second surfaces of said barrier.

8. The barrier of claim 7, wherein said strap is substantially vertically disposed when said barrier is secured within said vehicle.

9. The barrier of claim 5, wherein two of said straps extend in spaced-apart relation along one of said first and second surfaces.

10. The barrier of claim 9, wherein two of said tie rods are employed.

11. The barrier of claim 10, wherein a pair of said spaced-apart plates are employed at each of said ends of said two straps.

12. The barrier of claim 11, wherein said straps extend along said first surface, said first surface being forward of said second surface when said barrier is attached to said vehicle.

13. The barrier of claim 5, wherein said panel, said strap, said frame, and said fittings are formed from aluminum.

14. The barrier of claim 2, wherein said tie rod is directed at an acute angle to the planes of said first and second surfaces of said barrier.

15. The barrier of claim 1, wherein said means for withstanding said in-plane component of said loads comprises:

at least one strap positioned adjacent one of said first and second surfaces, said strap extending across said one of said first and second surfaces and having ends that are connected to said attachment means.

16. The barrier of claim 1, further comprising:

a frame attached along the perimeter of said panel, said frame being constructed to retain said perimeter of said panel when said loads are applied to said barrier, said attachment means being secured to said frame.

17. A restraint barrier, securable within a vehicle to resist loads created in said barrier by the action of contents of said vehicle against said barrier, said barrier comprising:

a panel, having a plurality of relatively thin-walled cells arranged in a honeycomb pattern and closed by relatively thin face sheets, said face sheets defining a first surface of said panel against which said contents of said vehicle act and a second surface of said panel, said cells having axes that are substantially perpendicular to said first and second surfaces, said panel being for withstanding the component of said loads created substantially parallel to said axes of said cells;

a frame provided along the perimeter of said panel;

means for withstanding the component of said loads created substantially perpendicular to said axes of said cells, said means for withstanding being connected to said frame; and attachment means, connected to said frame, for directing said component of said loads created substantially perpendicular to said axes of said cells to said means for withstanding said component, said attachment means comprising at least one pair of spaced-apart plates connected to said frame and provided with aligned openings that define an axis of restraint barrier attachment that is positioned with respect to said plates to produce substantially zero force in said first surface of said panel when said barrier withstands said loads.

18. The barrier of claim 17, further comprising:

at least one tie rod having a first end connected to said attachment means and a second end connectable to said vehicle, said tie rod being directed at an angle to said axes of said cells of said panel.

19. The barrier of claim 17, wherein said means for withstanding said component of said loads created substantially perpendicular to said axes of said cells comprises:

at least one strap positioned adjacent said second surface and having ends connected to said attachment means.

* * * * *